United States Patent [19]
Koseki et al.

[11] Patent Number: 4,934,429
[45] Date of Patent: Jun. 19, 1990

[54] LOW-SECTION PNEUMATIC RADIAL TIRES

[75] Inventors: Hiroyuki Koseki; Takashi Kukimoto; Yoshinobu Shoyama, all of Kodaira, Japan

[73] Assignee: Bridgestone Corporation, Tokyo, Japan

[21] Appl. No.: 265,968

[22] Filed: Nov. 2, 1988

[30] Foreign Application Priority Data

Nov. 6, 1987 [JP] Japan .................. 62-280814
Nov. 6, 1987 [JP] Japan .................. 62-280815

[51] Int. Cl.$^5$ .................. B60C 9/28; B60C 11/06
[52] U.S. Cl. .................. 152/538; 152/209 D; 152/531
[58] Field of Search .......... 152/531, 538, 209 D, 152/209 R, 534, 535, 536, 454

[56] References Cited

U.S. PATENT DOCUMENTS

2,958,359 11/1960 Boussu et al. .................. 152/531
4,271,890 6/1981 Pommier .................. 152/538 X

FOREIGN PATENT DOCUMENTS

2309355 11/1976 France .................. 152/531
60-45404 3/1985 Japan .................. 152/209 D

*Primary Examiner*—Raymond Hoch
*Attorney, Agent, or Firm*—Sughrue, Mion, Zinn, Macpeak & Seas

[57] ABSTRACT

A low-section pneumatic radial tire having an aspect ratio of not more than 0.85 and excellent resistance to uneven wear and belt end separation comprises at least one carcass ply of radial construction, a tread and a belt of at least two belt plies. In this tire, the reinforcing layer composed of two or less reinforcing plies is arranged between an outermost belt ply in the radial direction and the carcass, and at least one reinforcing ply of the reinforcing layer is comprised of first and second reinforcing ply segments arranged at both sides with respect to the equator so that the ply segment is located between an outer point separated from a shoulder end at a distance corresponding to 1/7 of tread width and an inner point separated from the equator of the tire at a distance corresponding to 1/10 of tread width.

11 Claims, 12 Drawing Sheets

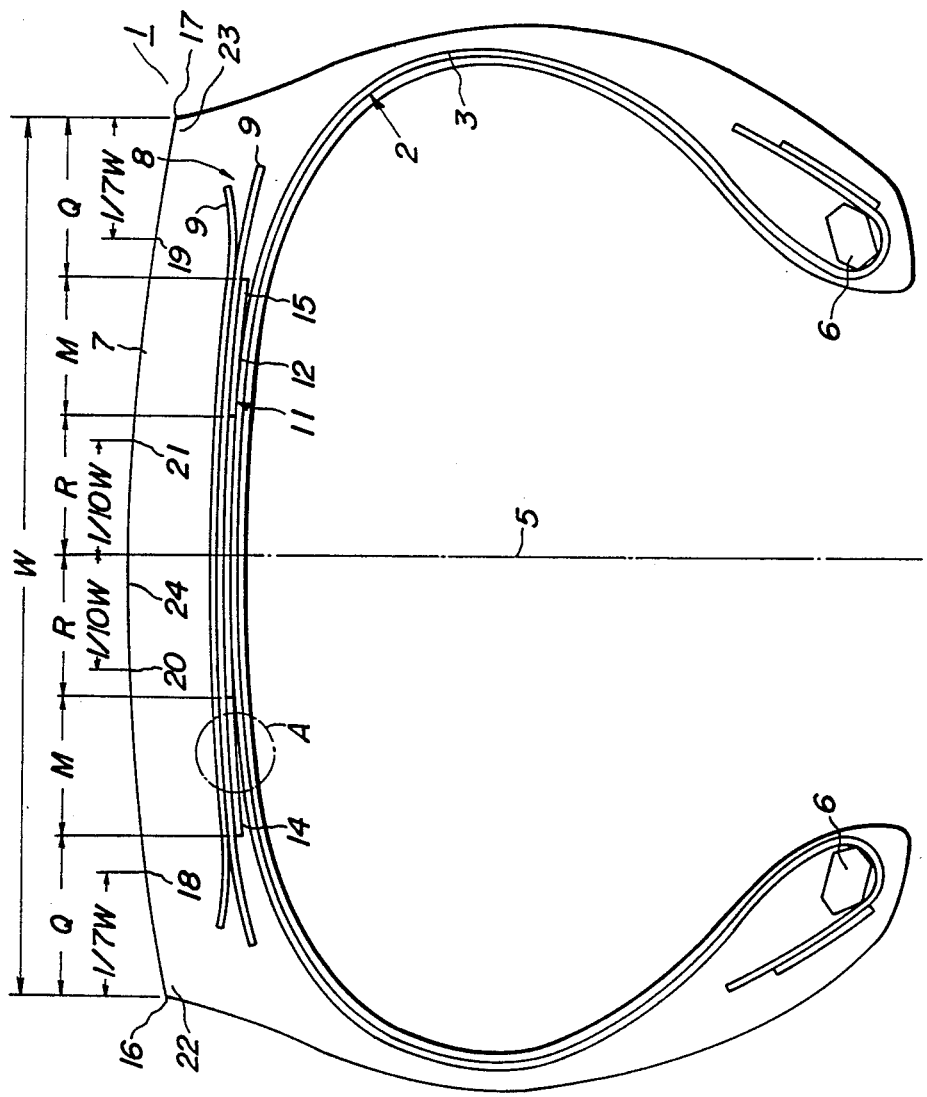

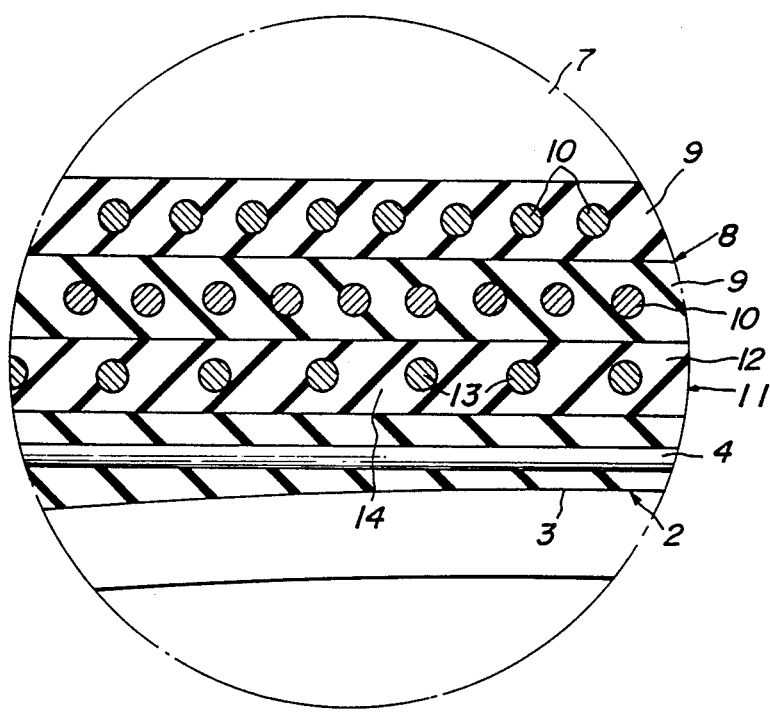
FIG_2

FIG_3a
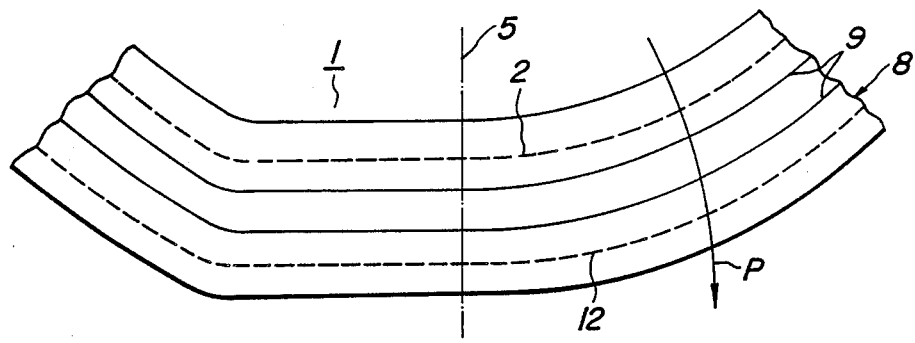
FIG_3b
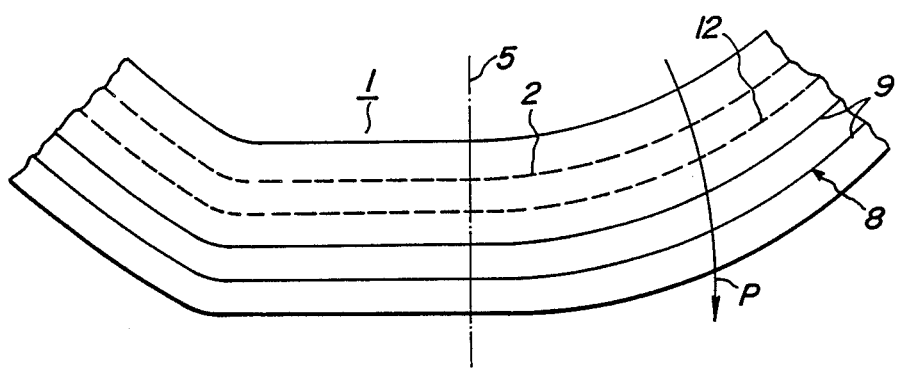

FIG_4a
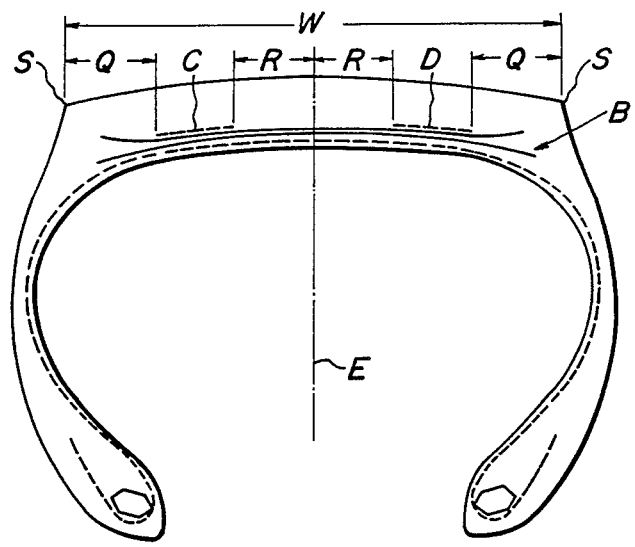
FIG_4b
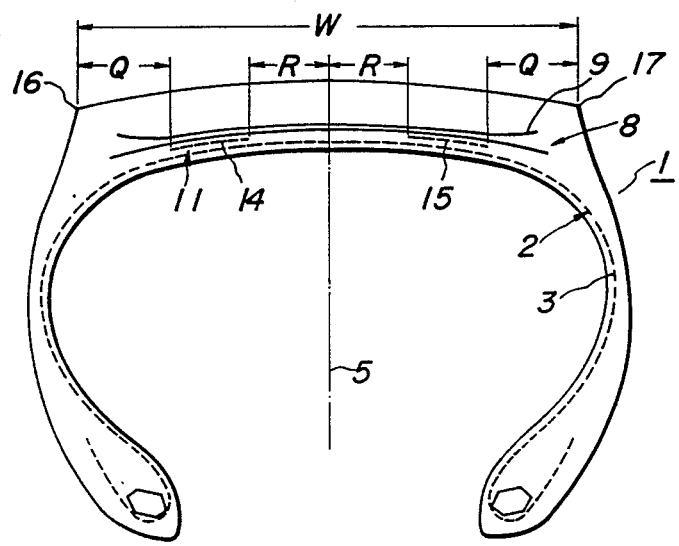

FIG_4c
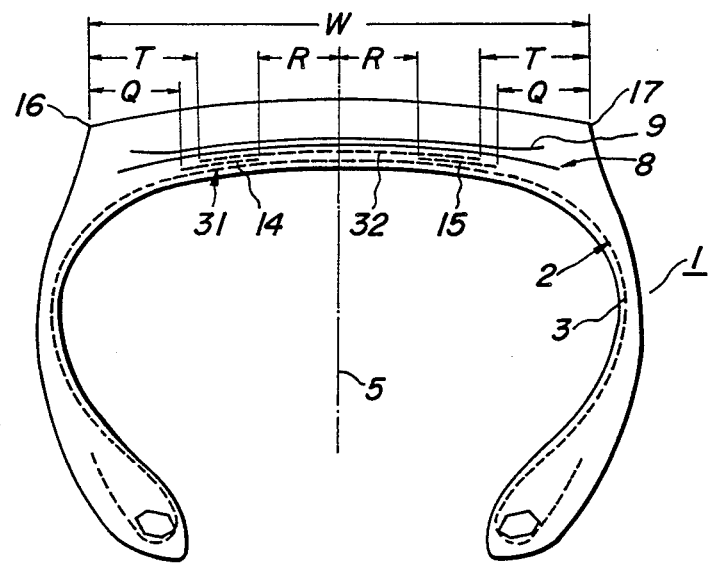

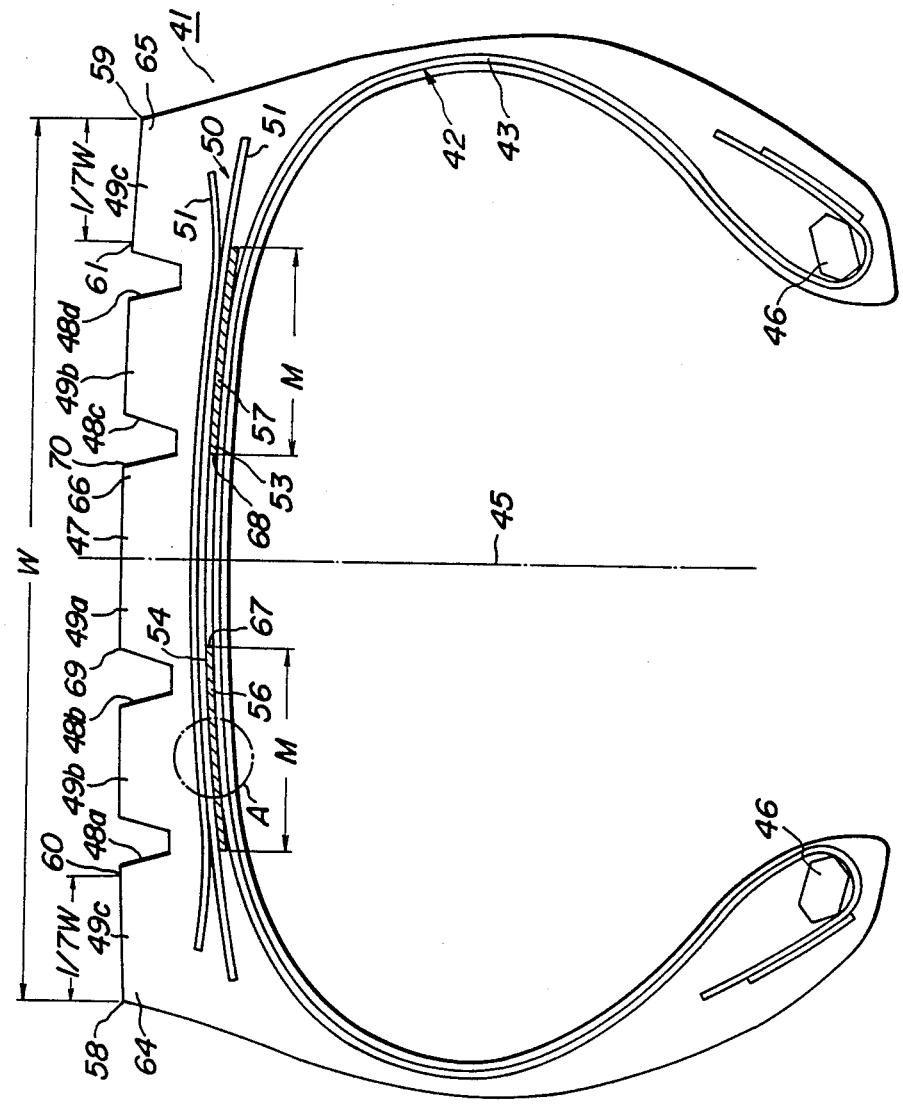

FIG_6
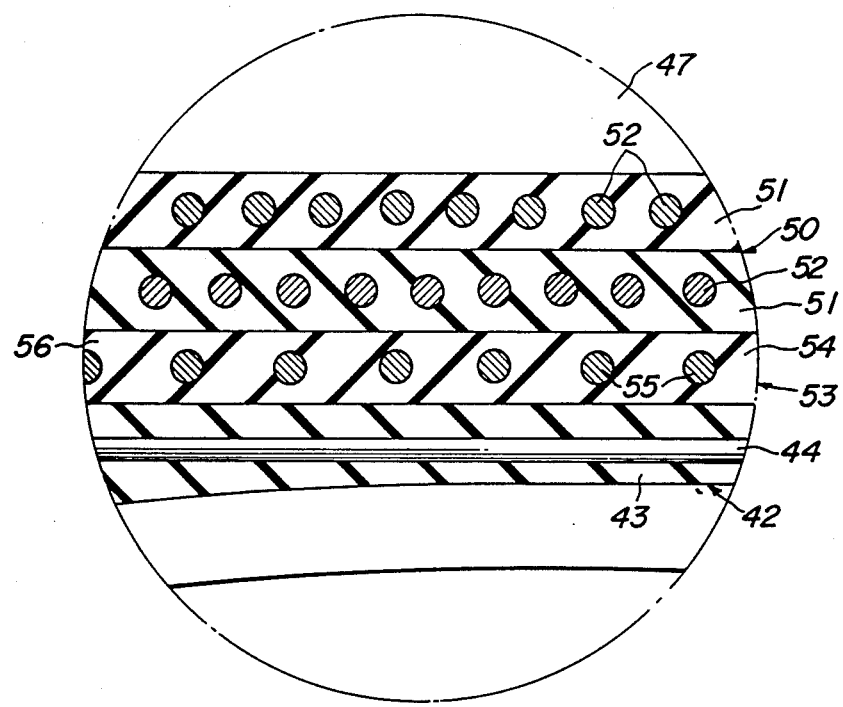

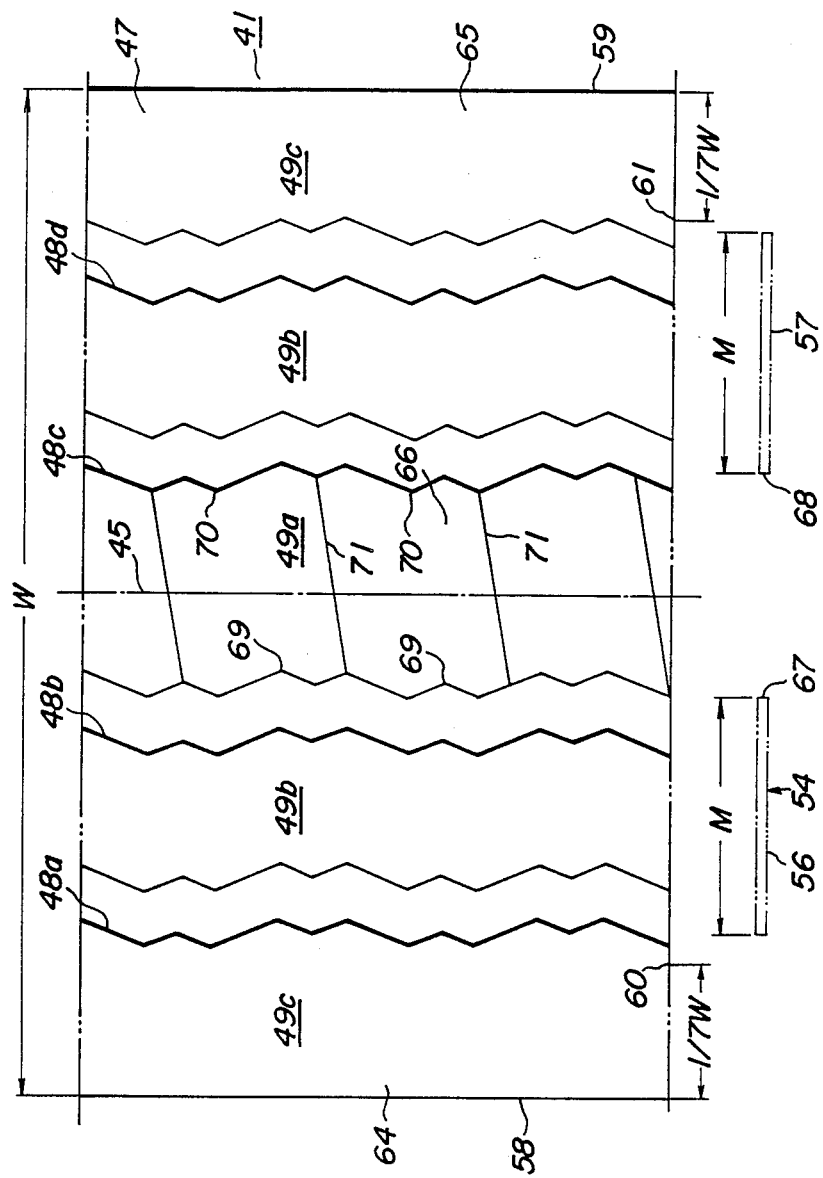

FIG_8e
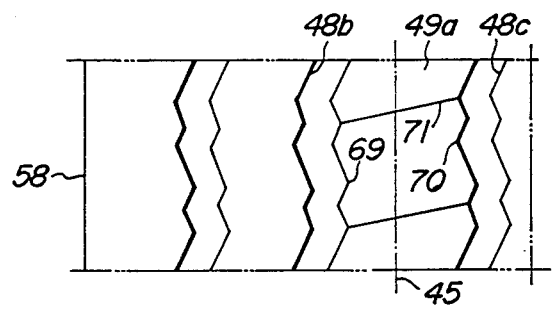
FIG_8f
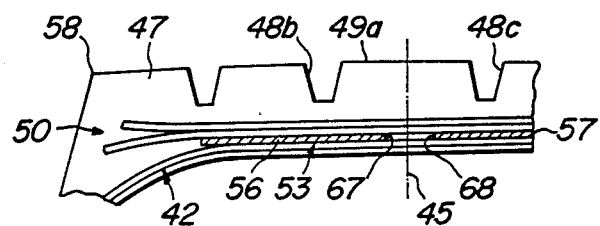
FIG_8g
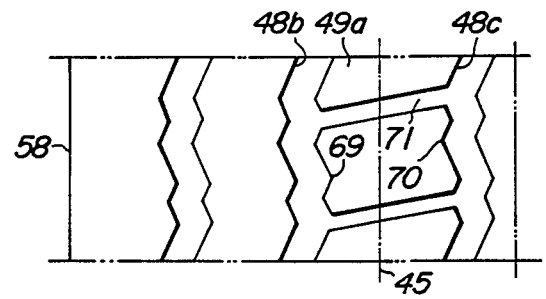
FIG_8h
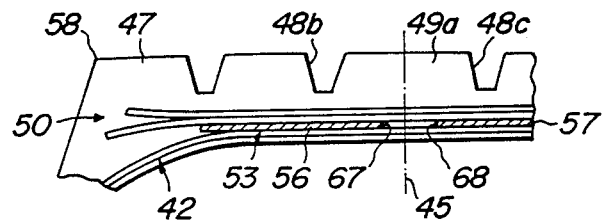

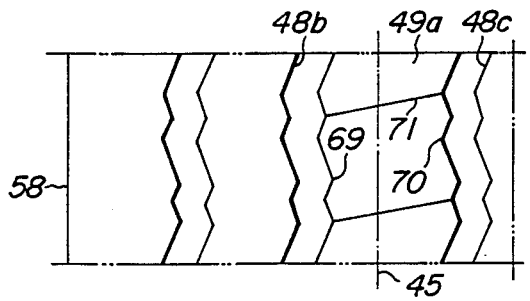
FIG_8i
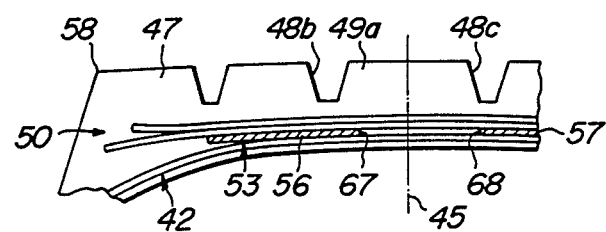
FIG_8j
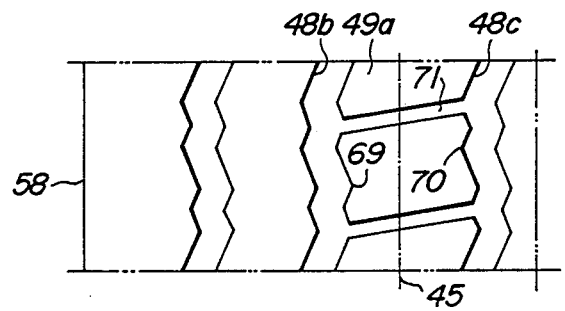
FIG_8k
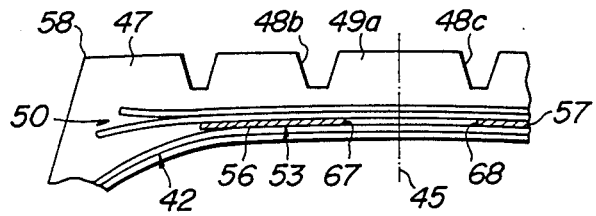
FIG_8l

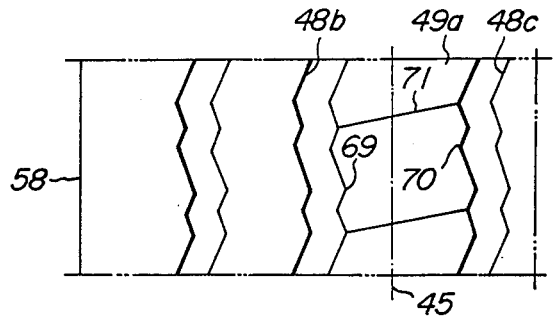
FIG_8m
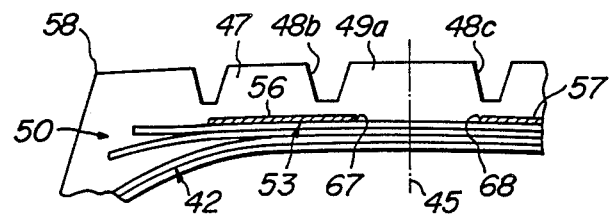
FIG_8n
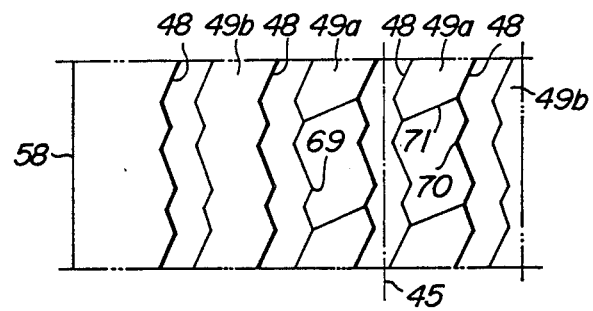
FIG_8o
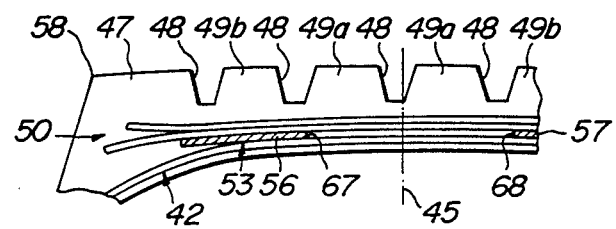
FIG_8p

LOW-SECTION PNEUMATIC RADIAL TIRES

BACKGROUND OF THE INVENTION

1. Field of the Invention

This invention relates to a low-section pneumatic radial tire having an aspect ratio of not more than 0.85.

2. Related Art Statement

In general, various problems in the low-section pneumatic radial tire having an aspect ratio of not more than 0.85 are produced by ground contact deformation during running under loading after inflation at a given internal pressure. Two large troubles among them, are particularly uneven wear based on the large size growth at a point separating inward from shoulder end by a distance corresponding to about ¼ of tread width such as unsymmetrical wear, shoulder wear or the like; and belt end separation based on shearing force between plies at belt end. In order to overcomes the troubles as mentioned above, there has hitherto been proposed a low-section radial tire as disclosed in Japanese Patent laid open No. 60-22,504. In this tire, a pair of reinforcing bands each containing cords embedded at a cord angle of not more than 5° are arranged outward from the belt in the radial direction and at both sides with respect to the center of the belt in such a manner that when a distance ranging from the belt center to an end of the belt is L, a distance ranging from the belt center to an inner end of the reinforcing band is within a range of 0.2L to 0.4L and a distance ranging from the belt center to an outer end of the reinforcing band is within a range of 0.7L to 0.8L.

In the conventional low-section radial tire, the region causing a large size growth is surely restrained to uniformize the growth amount over the entire width of the tread, so that the former trouble, i.e. the unevenness can surely be prevented. However, the ground contact pressure at the central region of the tread in its widthwise direction is merely reduced by the uniformization of the growth amount to lessen the heat build-up of the tread. Hence, that the shearing force between the plies at the belt end during the running under loading can not be reduced and consequently the belt end separation can not effectively be prevented.

On the other hand, U.S. Pat. No. 4,271,890 discloses that a limiting block is arranged between the belt ply and the carcass and is formed of two plies containing cords arranged at a cord angle smaller than that of the belt ply with respect to the circumferential direction, the cords of which plies being crossed with each other. In this case, the shearing force at the belt end is reduced, but it is apt to cause separation failure at the end of the limiting block through the shearing force.

SUMMARY OF THE INVENTION

It is, therefore, an object of the invention to solve the aforementioned drawbacks of the conventional techniques and to provide a low-section pneumatic radial tire in which the cord arrangement in the reinforcing layer arranged between the carcass and the belt layer is made in parallel to the equator of the tire to thereby prevent the occurrence of shearing force in the reinforcing layer itself.

According to a first aspect of the invention, there is the provision of a low-section pneumatic radial tire comprising a carcass composed of at least one carcass ply containing cords embedded therein to substantially extend in the radial direction of the tire. A tread is arranged outside said carcass in the radial direction and a belt composed of at least two belt plies containing cords therein, cords of which plies being crossed with each other at an angle of 10° to 40° with respect to the equator of the tire, and having an aspect ratio of not more than 0.85. A reinforcing is layer composed of two or less reinforcing plies each containing cords arranged substantially in parallel to the equator of the tire is arranged between a belt ply arranged at an outermost side in the radial direction and the carcass, and at least one reinforcing ply of the reinforcing layer comprises of first and second reinforcing ply segments arranged at both sides with respect to the equator so that each of said first and second reinforcing ply segments is located between an outer point separated from a shoulder end at a distance corresponding to 1/7 of tread width and an inner point separated from the equator of the tire at a distance corresponding to 1/10 of tread width.

According to a second aspect of the invention, there is the provision of a low-section pneumatic radial tire comprising a carcass composed of at least one carcass ply containing cords embedded therein so as to substantially extend in the radial direction of the tire. A tread is arranged outside the carcass in the radial direction and a belt composed of at least two belt plies contains cords therein, cords of the plies being crossed with each other at an angle of 10° to 40° with respect to the equator of the tire, and having an aspect ratio of not more than 0.85. A reinforcing layer composed of two or less reinforcing plies each containing cords arranged at an inclination angle of 0°–10° with respect to the equator of the tire is arranged between a belt ply arranged at an outermost side in the radial direction and the carcass. Four or five annular main grooves are arranged in substantially parallel to said equator and are formed on an outer circumference of said tread to define a center rib at a central part of said tread in the widthwise direction thereof and a pair of side ribs located at both sides of said center rib, and an inner end in widthwise direction of each of said first and second reinforcing ply segments is located outward from an innermost end of said main groove between said center rib and said side rib in the widthwise direction. A plurality of lateral grooves are separated away from each other in the circumferential direction of the tire and opening to said main grooves are formed in said center rib.

BRIEF DESCRIPTION OF THE DRAWINGS

The invention will be described with reference to the accompanying drawings, wherein:

FIG. 1 is a schematically meridional section view of a first embodiment of the low-section pneumatic radial tire according to the invention;

FIG. 2 is an enlarged view in a portion A of FIG. 1;

FIGS. 3a and 3b are schematically circumferential section views illustrating an influence of the reinforcing ply upon the belt, respectively;

FIGS. 4a to 4c are schematically meridional section views of tires used in a first test example, respectively;

FIG. 5 is a schematically meridional section view of another embodiment of the low-section pneumatic radial tire according to the invention;

FIG. 6 is an enlarged view in a portion A of FIG. 5;

FIG. 7 is a developed view of a tread in the tire of FIG. 5; and

DESCRIPTION OF THE PREFERRED EMBODIMENTS

Figure 8A:
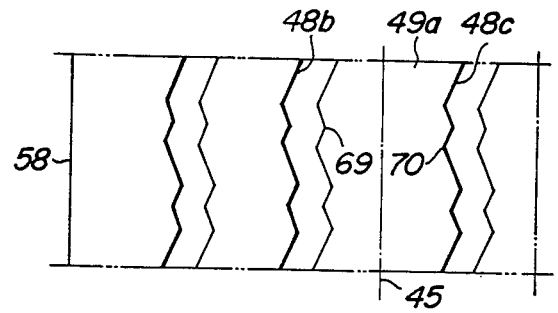
FIGS. 8a to 8p are tread developed views and meridional section views of tires used in a fourth test example, respectively.

According to the invention, the first and second reinforcing ply segments arranged at both sides with respect to the equator of the tire are located between the outer point separated from the shoulder end at a distance corresponding to 1/7 of the tread width and the inner point separated from the equator of the tire at a distance corresponding to 1/10 of tread width. A region causing a largest size growth during the inflation under internal pressure is restrained by each of the first and second reinforcing ply segments causing no extension, whereby the growth amount of the tire is made substantially uniform over the entire width thereof and the occurrence of uneven wear is surely prevented. Further, in order to prevent belt end separation by effectively reducing the shearing force between the plies at the belt end during the running under loading, according to the invention, the first and second reinforcing ply segments are arranged between the belt ply arranged at the outermost side in the radial direction and the carcass. As a result, when the ground contacting deformation is caused in the tire during running under loading, since the length of each of the first and second reinforcing ply segments in the circumferential direction of the tire is substantially unchanged, the compressive force in the circumferential direction is applied to the belt ply located outside the first and second reinforcing ply segments in the radial direction, whereby the shearing force between the plies at the belt end is largely reduced to surely prevent the occurrence of belt end separation.

In the preferred embodiment of the invention, the inner end of each of the first and second reinforcing ply segments in the widthwise direction is located outside the widthwisely innermost end of the main groove between the center rib and the side rib in the widthwise direction of the tire, so that each of the first and second reinforcing ply segments never overlaps with the center rib and consequently the occurrence of river wear at the center rib can be prevented. Moreover, even when the side rib overlapping with each of the first and second reinforcing ply segments is waved in the circumferential direction, lateral grooves are formed in the center rib not subjected to restraint by the first and second reinforcing ply segments to thereby conduct the size reduction of the concave portion in the side rib followed to the center rib, so that the ground contact pressure becomes uniform and the rapid wear of the concave portion, i.e. rib punching is prevented.

In FIGS. 1 and 2, numeral 1 is a first embodiment of the low-section pneumatic radial tire according to the invention, which has an aspect ratio (tire height/tire width) of not more than 0.85. This tire 1 comprises a toroidal carcass 2 composed of at least one carcass ply 3 (single carcass ply in this embodiment). The carcass ply 3 contains many reinforcing cords 4 made from steel or the like therein. The cords 4 extend in substantially a radial direction or in a direction substantially perpendicular to the equator 5 of the tire. Both side end portions of the carcass 2 are turned up around a pair of ring-like bead cores 6 from inside toward outside. Numeral 7 is a tread arranged outside the carcass 2 in the radial direction. Between the tread 7 and the carcass 2 is arranged a belt 8. The belt 8 is composed of at least two belt plies 9 (two plies in this embodiment) each containing many reinforcing cords 10 made from steel or the like therein. The cords 10 of the two belt plies 9 are inclined at a certain angle with respect to the equator 5 of the tire and crossed with each other with respect to the equator 5. The inclination angle of the cords 10 is within a range of 10° to 40° with respect to the equatorial line 5.

Numeral 11 is a reinforcing layer composed of two or less reinforcing plies 12 (one reinforcing ply in the illustrated embodiment). The reinforcing ply 12 is comprised by helically winding a cord 13 in substantially parallel to the equator 5 of the tire or arranging a plurality of cords 13 in parallel to each other with respect to the tire equatorial line. Thus, the reinforcing layer 11 has a strong hoop effect. The reason why the reinforcing layer 11 is composed of two or less reinforcing plies 12 is due to the fact that when using three or more reinforcing plies, the total gauge of the tread 7, the belt 8 and the reinforcing layer 11 becomes too thick and is harmful from a viewpoint of the heat build-up. Moreover, at least one reinforcing ply 12 constituting the reinforcing layer 11 is comprised of a pair of first reinforcing ply segment 14 and second reinforcing ply segment 15 arranged at both sides with respect to the equator 5. Therefore, when the reinforcing layer 11 is composed of the two reinforcing plies 12, the remaining reinforcing ply 12 may be continuous in the widthwise direction thereof.

The first and second reinforcing ply segments 14 and 15 should be located between an outer point 18 or 19 separated from shoulder end 16 or 17 of the tire 1 at a distance corresponding to 1/7 of tread width W and an inner point 20 or 21 separated from the equator 5 of the tire 1 at a distance corresponding to 1/10 of tread width W, respectively. Because, when the first and second reinforcing ply segments 14 and 15 extend outward from the outer points 18 and 19 in the widthwise direction, regions not requiring the restraint of size growth are reinforced by these ply segments, so that the uniform size growth can not be carried out over a whole of the tread width and consequently the uneven wear such as unsymmetrical wear, shoulder wear or the like is caused at the shoulder portions 22 and 23. On the other hand, when the first and second reinforcing ply segments 14 and 15 extend inward from the inner points 20 and 21 in the widthwise direction, the size growth of the tire 1 becomes ununiform during the inflation under internal pressure likewise the above case and consequently the uneven wear such as river wear or the like is caused at the central portion 24. Moreover, the width M of each of the first and second reinforcing ply segments 14 and 15 is preferable to be not less than ⅛ of the tread width W because when the width M is less than ⅛ W, the effect of preventing the uneven wear and retraining the belt end separation becomes insufficient.

The shoulder ends 16 and 17 of the tire 1 and the tread width W are synonymous with ground contact ends and ground contact width on the meridional section of the tire when the tire 1 is inflated under normal internal pressure and subjected to normal loading.

According to the invention, the first and second reinforcing ply segments 14 and 15 having a strong hoop effect are arranged at the positions as mentioned above, so that regions causing the maximum size growth during the inflation under internal pressure in the low-section radial tire 1, i.e. regions near to points separated from the shoulder ends 16 and 17 at a distance corresponding to ¼ of the tread width are restrained by the first and second reinforcing ply segments 14 and 15 hardly causing the extension, and consequently the growth amount of the tire 1 is made substantially uniform over the full width thereof and the occurrence of uneven wear is surely prevented.

Further, the first and second reinforcing ply segments 14 and 15 are arranged between the outermost belt ply 9 of the belt 8 in the radial direction and the carcass 2. Here, the circumferential displacement of each belt ply 9 on the equator 5 of the tire is examined with reference to FIGS. 3a and 3b. In FIGS. 3a and 3b is shown the circumferential section of the region containing the reinforcing layer 11 in the tire 1 cut in parallel to the equator 5 of the tire, in which a left-side half is a deformation state when being contacted with ground during the running under loading and a rightside half is a free state. When the reinforcing ply 12 is arranged outside the belt 8 in the radial direction as shown in FIG. 3a, the circumferential length of the belt 8 is shorter than the circumferential length of the reinforcing ply 12. Also the circumferential length of the reinforcing ply 12 is not substantially changed even by the ground contacting deformation, so that when the belt 8 and the reinforcing ply 12 are changed into a flat form by subjecting to circumferentially bending force shown in an arrow P during the ground contacting, the belt 8 is dragged by the reinforcing ply 12. On the other hand, when the reinforcing ply 12 is arranged inside the outermost belt ply 9 of the belt 8 in radial direction (between the belt 8 and the carcass 2 in the illustrated case) as shown in FIG. 3b, if the belt 8 and the reinforcing layer 12 are changed into flat form by subjecting to circumferentially bending force P during the ground contacting, the outer belt ply 9 is compressed by the reinforcing ply 12. Thus, when the reinforcing ply 12 (i.e. first and second reinforcing ply segments 14 and 15) is arranged between the outermost belt ply 9 of the belt 8 in the radial direction and the carcass 2, the influence of the above compressive force is given from the first and second reinforcing ply segments 14 and 15 to both widthwise end portions of the outermost belt ply 9 to restrain the shearing force at the belt end, whereby the belt end separation is surely prevented. Such an effect becomes larger as the first and second reinforcing ply segments 14 and 15 are located further inward in the radial direction, so that it is favorable that the first and second reinforcing ply segments 14 and 15 are arranged between the total belt ply 9, i.e. the belt 8 and the carcass 2 as shown in this embodiment.

Moreover, it is preferable that the total modulus of elasticity in cord direction of the reinforcing ply 12 per unit width is within a range of 10% to 35% of total modulus of elasticity in cord direction of the belt ply 9 per unit width. When the total modulus of elasticity in the reinforcing ply 12 is less than 10%, the effect of restraining the size growth in the inflation under internal pressure can not be expected and the effect of reducing the shearing force between the plies at the belt end during the running under loading is small and consequently the improvement of the resistance to belt end separation is not expected. On the other hand, when it exceeds 35%, the tension bearing of the reinforcing layer 11 becomes larger compared with that of the belt 8, and particularly there is a fear of causing the breakage of the reinforcing ply 12 due to the degradation of the followability against protrusions on road surface or the like. For the cord 13 for the reinforcing ply 12, use may be made of steel cord having an extensibility, aromatic polyamide fiber cord and the like.

A first test example will now be described. In this test, there are provided a comparative tire 1 and test tires 1 and 2 each having a tire size of 11/70 R22.5. The comparative tire 1 is shown in FIG. 4a, in which the first and second reinforcing ply segments C and D are arranged outside the belt B in the radial direction in such a manner that a distance Q from the shoulder end S of the tire to the outer end in widthwise direction of each of the first and second reinforcing ply segments C and D is 19% of the tread width W. A distance R from the equator E of the tire to the inner end in widthwise direction of each of the first and second reinforcing ply segments C and D is 13% of the tread width W. The test tire 1 is shown in FIG. 4b, in which the reinforcing layer 11 composed of the first and second reinforcing ply segments 14 and 15 is arranged between the belt 8 and the carcass 2 in such a manner that a distance Q from the shoulder ends 16, 17 to outer points in widthwise direction of the first and second reinforcing ply segments 14, 15 is 19% of the tread width W and a distance R from the equator 5 of the tire to inner points in widthwise direction of the first and second reinforcing ply segments 14, 15 is 13% of the tread width W. Further, the test tire 2 is shown in FIG. 4c, in which an inner reinforcing ply 31 composed of first and second reinforcing ply segments 14, 15 is arranged between the belt 8 and the carcass 2 and an outer reinforcing ply 32 continuously extending in the widthwise direction is arranged between the inner reinforcing ply 31 and the belt 8. In the test tire 2, the first and second reinforcing ply segments 14 and 15 are arranged in such a manner that a distance Q from the shoulder end 16, 17 to the outer point in widthwise direction of the first and second reinforcing ply segments 14, 15 is 19% of the tread width W. A distance R from the equator 5 of the tire to the inner point in widthwise direction of the first and second reinforcing ply segments 14, 15 is 13% of the tread width W. The outer reinforcing ply 32 is arranged so that a distance T from the shoulder end 16,17 to both outer ends in widthwise direction of the outer reinforcing ply 32 is 21% of the tread width W. The other dimensions of these tires are shown in the following Tables 1 and 2.

TABLE 1

|  | Comparative tire 1 | | Test tire 1 | | Test tire 2 | |
| --- | --- | --- | --- | --- | --- | --- |
|  | Tensile modulus (Kg/cm) | cord angle width (mm) | Tensile modulus (Kg/cm) | cord angle width (mm) | Tensile modulus (Kg/cm) | cord angle width (mm) |
| First belt ply | $6.4 \times 10^4$ | right 18° 200 | $6.4 \times 10^4$ | right 18° 200 | $6.4 \times 10^4$ | right 18° 200 |
| Second belt ply | $6.4 \times 10^4$ | left 18° 185 | $6.4 \times 10^4$ | left 18° 185 | $6.4 \times 10^4$ | left 18° 185 |
| First and second reinforcing ply | $2.4 \times 10^4$ (cap) | 0° 39 | $2.4 \times 10^4$ | 0° 39 | $1.8 \times 10^4$ | 0° 39 |

TABLE 1-continued

|  | Comparative tire 1 | | Test tire 1 | | Test tire 2 | |
| --- | --- | --- | --- | --- | --- | --- |
|  | Tensile modulus (Kg/cm) | cord angle width (mm) | Tensile modulus (Kg/cm) | cord angle width (mm) | Tensile modulus (Kg/cm) | cord angle width (mm) |
| segments Outer reinforcing ply |  |  |  |  | $1.8 \times 10^4$ | 0° 126 |

Tensile modulus: product of sectional area of cord and Young's modulus and end count per unit width

TABLE 2

|  | Comparative tire 1 | | Test tire 1 | | Test tire 2 | |
| --- | --- | --- | --- | --- | --- | --- |
|  | Cord construction | end count (cords/cm) | Cord construction | end count (cords/cm) | Cord construction | end count (cords/cm) |
| First belt ply | 3 × 0.20 + 6 × 0.38 | 5.5 | 3 × 0.20 + 6 × 0.38 | 5.5 | 3 × 0.20 + 6 × 0.38 | 5.5 |
| Second belt ply | " | " | " | " | " | " |
| First and second reinforcing ply segments | 4 × 4 × 0.23 | 4.8 | 4 × 4 × 0.23 | 4.8 | 4 × 4 × 0.23 | 3.6 |
| Outer reinforcing ply |  |  |  |  | " | " |

Each of these tires was mounted on a front wheel of a 2-D-4 model flat body truck (which has a single shaft for front wheel and two shafts for rear wheel, one of the latter shafts being a driving shaft, and four tires are mounted on each of the shafts for rear wheel) and then run on a running road consisting of 70% paved expressway and 30% paved general road under an internal pressure of 8.0 kg/cm² and a 100% load over a distance of 100,000 km. After running, the belt ply was peeled off from each tire to measure a crack length at the belt end. As a result, when the index value for the comparative tire 1 is 100, the test tire 1 is 76 as an index value, and the test tire 2 is 62 as an index value, from which it is apparent that in test tires 1 and 2, the crack length at the belt end can sufficiently be reduced. Moreover, when the outer reinforcing ply 32 is arranged as in the test tire 2, the shearing force at the belt end during the running under loading is further restrained to improve the resistance to belt end separation. In the comparative tire 1, the crack length was actually 6.0 mm.

A second test example will be described below. In this test, there were provided a comparative tire 2 having the distance Q of 11% (less than 1/7 W) and the distance R of 13% (more than 1/10 W), a comparative tire 3 having the distance Q of 19% (more than 1/7 W) and the distance R of 6% (less than 1/10 W), and a test tire 3 similar to the test tire 1 and having the distance Q of 19% (more than 1/7 W) and the distance R of 13% (more than 1/10 W), which were run under the same conditions as in the first test example. The other dimensions of these tires were the same as in the test tire 1. After the running, the amount of shoulder wear was measured in the same manner as mentioned above. When the index value for the comparative tire 2 is 100, the test tire 3 is 31 as an index value. The actual amount of the comparative tire 2 was 3.8 mm. On the other hand, when examining the central portion 24 of the tread after the running, river wear having a width of 3.0 mm and a depth of 1.2 mm was produced in the comparative tire 3, while such an uneven wear was not observed in the test tire 3. Thus, when the distances Q and R are not less than 1/7 W and 1/10 W, respectively, the uneven wear is satisfactorily reduced.

A third test example will now be described. In this test, there were provided a comparative tire 4 in which a value obtained by dividing total modulus of elasticity in cord direction of the reinforcing ply 12 per unit width by total modulus of elasticity in cord direction of the belt ply 9 per unit width was 7% (which is not more than 10%) and a test tire 4 having the value of 14% (within a range of 10–35%), which were run under the same conditions as in the first test example. Moreover, the other dimensions of these tires are the same as in the test tire 1. After running, the crack length at the belt end was measured in the same manner as mentioned above. When the index value for the comparative tire 4 is 100, the test tire 4 is 83 as an index value. The actual crack length of the comparative tire 4 was 5.8 mm. Thus, when the divided value is not less than 10%, the belt end separation can surely be prevented.

FIGS. 5 to 7 illustrate another embodiment of the low-section pneumatic radial tire according to the invention. This tire 41 comprises four or five annular main grooves formed on the outer circumference of the tread 47 in substantially parallel to the equator 45 of the tire and separated from each other in the widthwise direction thereof (four main grooves 48a, 48b, 48c and 48d in the illustrated embodiment). As a result, the outer circumference of the tread 47 is divided into a center rib 49a located at the central part in widthwise direction, a pair of side ribs 49b located adjacent to both sides of the center rib 49a in widthwise direction and a pair of end ribs 49c located outside the side ribs 49b in widthwise direction by these main grooves 48a to 48d. Moreover, when using five main grooves 48, a central main groove 48 is located at the equator 45 of the tire, so that the center rib is comprised of two ribs located at the central part of the tread.

A belt 50 is arranged between tread 47 and carcass 42 and is composed of at least two belt plies 51 (two belt plies in the illustrated embodiment). The belt ply 51 contains many reinforcing cords 52 made from steel or the like. The cords 52 of these belt plies 51 are inclined at a certain angle with respect to the equator 45 of the tire and crossed with each other. The inclination angle of cords 52 with respect to the equator 45 is within a range of 10° to 40°.

Numeral 53 is a reinforcing layer composed of two or less reinforcing plies 54 (one reinforcing ply in the illustrated embodiment), which is arranged between the tread 47 and the carcass 42 (between the carcass 42 and the belt 50 in the illustrated embodiment). Moreover, the reinforcing layer 53 may be arranged between the tread 47 and the belt 50 or between the belt plies 51 of the belt 50. The reinforcing ply 54 is comprised by helically winding a cord 52 or arranging a plurality of cords 52 in parallel to each other at an inclination angle smaller than that of the cords in the belt ply 51 with respect to the equator 45 of the tire or at an angle of not more than 10° with respect to the equator 45. The reason why the reinforcing layer 53 is composed of two or less reinforcing plies 54 is due to the fact that when using three or more reinforcing plies, the total gauge of the tread 47, the belt 50 and the reinforcing layer 53 becomes too thick and is harmful from a viewpoint of the heat build-up. Moreover, at least one reinforcing ply 54 constituting the reinforcing layer 53 is comprised of a pair of first reinforcing ply segment 56 and second reinforcing ply segment 57 arranged at both sides with respect to the equator 45. Therefore, when the reinforcing layer 53 is composed of the two reinforcing plies 54, the remaining reinforcing ply 54 may be continuous in the widthwise direction thereof.

The first and second reinforcing ply segments 56 and 57 are preferably located inside an outer point 60 or 61 separated from shoulder end 58 or 59 of the tire 40 at a distance corresponding to 1/7 of tread width W, respectively. When the first and second reinforcing ply segments 56 and 57 extend outward from the outer points 60 and 61 in the widthwise direction, both side end portions in widthwise direction of the belt 50 are restrained by these ply segments 56 and 57 to increase the rigidity thereof. Consequently the uneven wear such as unsymmetrical wear, shoulder wear or the like is caused at the shoulder portions 64 and 65. Each of the first and second reinforcing ply segments 56 and 57 substantially overlaps with the above side rib 49b. Moreover, the width M of each of the first and second reinforcing ply segments 56 and 57 is preferable to be not less than ⅛ of the tread width W because when the width M is less than ⅛ W, the effect of restraining the belt end separation becomes insufficient.

The shoulder ends 58 and 59 of the tire 40 and the tread width W are synonymous with ground contact ends and ground contact width on the meridional section of the tire when the tire 41 is inflated under normal internal pressure and subjected to normal loading.

According to the invention, the first and second reinforcing ply segments 56 and 57 are arranged as mentioned above, so that regions causing the maximum size growth during the inflation under internal pressure in the tire 41, i.e. regions near to points separated from the shoulder ends 58 and 59 at a distance corresponding to ¼ of the tread width are restrained by the first and second reinforcing ply segments 56 and 57 hardly causing the extension. Consequently the growth amount of the tire 41 is made substantially uniform over the full width thereof and the occurrence of uneven wear is surely prevented at the shoulder portions 64 and 65. Also the influence of the above restraint extends to the ply ends of the belt 50 to thereby reduce the shearing force between the plies of the belt 50, whereby the belt end separation is suppressed.

Furthermore, the first and second reinforcing ply segments 56 and 57 containing cords 55 arranged at the aforementioned inclination angle can not be substantially expanded, so that if the circumferential length of each of the first and second reinforcing ply segments 56 and 57 is wrong and longer due to the production error, that portion of the tread which overlaps with each of the first and second reinforcing ply segments 56 and 57, i.e. the surface of the side rib 49a takes a wavy is form. When such a waving is caused, the concave portion corresponding to the valley of the wave is dragged during the ground contacting and slipped against road surface to promote rapid wearing. Therefore, the inner ends 67 and 68 in widthwise direction of the first and second reinforcing ply segments 56 and 57 are located outward from the innermost ends 69 and 70 in widthwise direction of the main grooves 48b and 48c between the center rib 49a and the side rib 49b. A plurality of lateral grooves 71 separated away from each other in the circumferential direction and opening at both ends to the main grooves 48b and 48c are formed in the center rib 49a. As a result, the center rib 49a divided into blocks by the lateral grooves 71 easily deforms during ground contact and the radius thereof approaches to the radius of the concave portion, whereby the ground contact pressure is made uniform over the wide range and the rapid wearing at the concave portion is suppressed to prevent the rib punching. The reason why the inner ends 67 and 68 in widthwise direction of the first and second reinforcing ply segments 56 and 57 are located outward from the innermost ends 69 and 70 of the main grooves 48b and 48c in the widthwise direction is as follows. That is, when the first and second reinforcing ply segments 56 and 57 are partially overlapped with the center rib 49a by locating the inner ends 67 and 68 of the first and second reinforcing ply segments 56 and 57 inward from the innermost ends 69 and 70 of the main grooves 48b and 48c in the widthwise direction, the hoop effect of the first and second reinforcing ply segments 56 and 57 acts to the center rib 49a to increase the rigidity of the center rib 49a. Consequently the size reduction during the ground contacting is hardly conducted and also the rigidity of the overlapped region becomes higher than that of the other region to produce the difference in the radius between these regions, whereby only the overlapped portion in the center rib 49a is rapidly worn to produce the river wear. The term "innermost ends 69 and 70 in widthwise direction of the main grooves 48b and 48c" used herein means the inner wall in widthwise direction of the main groove when the main grooves 48b and 48c are straight, and valley nearest to the equator 45 of the tire among inner walls in widthwise direction of the main groove when the main grooves 48b and 48c are zigzag form. Further, the lateral groove 71 means a sipe opening to the main groove and closing during the ground contacting in the illustrated embodiment, but may be a wide groove not closing during the ground contacting. Moreover, the lateral groove 71 may be straight, zigzag or curved form.

Figure 8B:
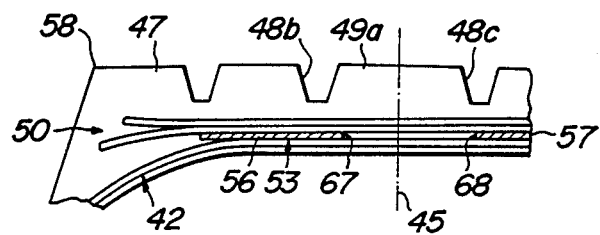
Figure 8C:
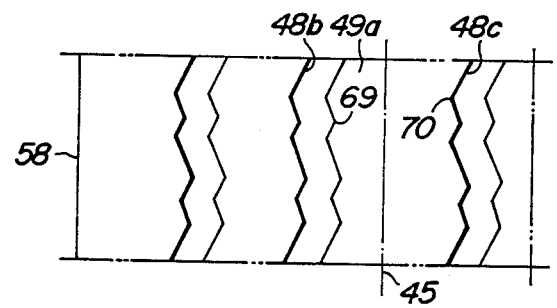
Figure 8D:
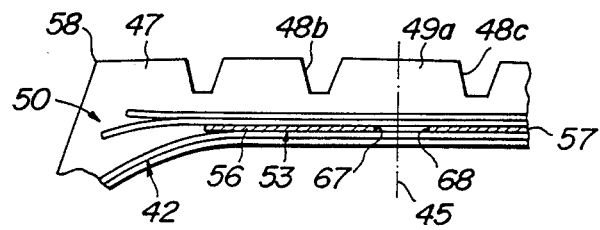

A fourth test example will now be described. In this test, there were provided comparative tires a to d and test tires A to D each having a tire size of 11/70 R22.5. The comparative tire a is a tire shown in FIGS. 8a and 8b, wherein the inner ends 67 and 68 of the first and second reinforcing ply segments 56 and 57 are located outward from the innermost ends 69 and 70 of the main grooves 48b and 48c in the widthwise direction but the lateral groove is not formed in the center rib 49a. The comparative tire b is a tire shown in FIGS. 8c and 8d, wherein the inner ends 67 and 68 of the first and second reinforcing ply segments 56 and 57 are located inward from the innermost ends 69 and 70 of the main grooves 48b and 48c in the widthwise direction but the lateral groove is not formed in the center rib 49a. The comparative tire c is a tire shown in FIGS. 8e and 8f, wherein the lateral grooves are formed in the center rib 49a as a sipe but the inner ends 67 and 68 of the first and second reinforcing ply segments 56 and 57 are located inward from the innermost ends 69 and 70 of the main grooves 48b and 48c in the widthwise direction. The comparative tire d is a tire shown in FIGS. 8g and 8h, wherein the lateral grooves are formed in the center rib 49a as a wide groove but the inner ends 67 and 68 of the first and second reinforcing ply segments 56 and 57 are located inward from the innermost ends 69 and 70 of the main grooves 48b and 48c in the widthwise direction.

On the other hand, the test tire A is a tire shown in FIGS. 8i and 8j corresponding to the above illustrated embodiment. The test tire B is a tire shown in FIGS. 8k and 8l, wherein the wide groove is used as a lateral groove 71 instead of the sipe in the test tire A. The test tire C is a tire shown in FIGS. 8m and 8n, wherein the first and second reinforcing ply segments 56 and 57 are arranged between the belt 50 and the tread 47 as a modified embodiment of the test tire A (between the belt 50 and the carcass 42). The test tire D is a tire shown in FIGS. 8o and 8p, wherein five main grooves 48 are used to define two center ribs 49a provided with lateral grooves 71 in the central part of the tread 47 and the inner ends 67 and 68 in widthwise direction of the first and second reinforcing ply segments 56 and 57 are located outward from the innermost ends 69 and 70 of the main grooves 48 between the center rib 49a and the side rib 49b in the widthwise direction.

The dimensions of the aforementioned tires are shown in the following Table 3. Moreover, the width of each of the first and second reinforcing ply segments 56 and 57 is 40 mm in the test tire A.

TABLE 3

| | Tensile modulus (Kg/cm) | Cord angle Width (mm) | Cord construction | End count (cords/cm) |
|---|---|---|---|---|
| First belt ply | $6.4 \times 10^4$ | right 18° 200 | $3 \times 0.20 + 6 \times 0.38$ | 5.5 |
| Second belt ply | $6.4 \times 10^4$ | left 18° 185 | " | " |
| First and second reinforcing ply segments | $2.4 \times 10^4$ | 0° — | $4 \times 4 \times 0.23$ | 4.8 |

Each of these tires was mounted on a front Wheel of a 2-D-4 model flat body truck (which has a single shaft for front wheel and two shafts for rear wheel, one of the latter shafts being a driving shaft, and four tires are mounted on each of the shafts for rear wheel) and then run on a running road consisting of 70% paved expressway and 30% paved general road under an internal pressure of 8.0 kg/cm² and a 100% load over a distance of about 100,000 km. After running, the tread of each tire was inspected. As a result, the rib punching having a depth of 2.6 mm was generated on the side rib 49b in case of the comparative tire a, and in case of the comparative tire b, the rib punching having the depth of 2.8 mm was generated on the side rib 49b and the river wear having a depth of 2.3 mm and a width of 6 mm was generated on the center rib 49a, and in case of the comparative tire c, the river wear having a depth of 2.0 mm and a width of 4 mm was generated on the center rib 49a, and in case of the comparative tire d, the river wear having a depth of 1.6 mm and a width of 5 mm was generated on the center rib 49a. On the contrary, the test tires A, C and D hardly generated uneven wear, but heel and tow wear was slightly observed on the center rib 49a in case of only the test tire B. Thus, in the comparative tires outside the scope of the invention, the uneven wear such as rib punching, river wear or the like was generated at a frequent degree, while the uneven wear hardly occurred in the test tires according to the invention, so that the occurrence of uneven wear could surely be prevented in the invention.

As mentioned above, according to the invention, not only the uneven wear such as unsymmetrical wear, shoulder wear, rib punching, river wear or the like but also the belt end separation can surely be prevented in the low-section pneumatic radial tire.

What is claimed is:

1. A low-section pneumatic radial tire comprising: a carcass composed of at least one carcass ply containing cords embedded therein so as to substantially extend in the radial direction of the tire, a tread arranged outside said carcass in the radial direction, a belt composed of at least two belt plies containing cords therein, cords of which plies being crossed with each other at an angle of 10° to 40° with respect to the equator of the tire, said tire having an aspect ratio of not more than 0.85; a reinforcing layer composed of two or less reinforcing plies each containing high elongation steel cords arranged substantially in parallel to the equator of the tire; said reinforcing layer arranged between a belt ply arranged at an outermost side in the radial direction and the carcass, and at least one reinforcing ply of the reinforcing layer is comprised of axially spaced-apart first and second reinforcing ply segments arranged at both sides with respect to the tire equator so that each of said first and second reinforcing ply segments is located between an outer point separated from a shoulder end at a distance corresponding to 1/7 of tread width and an inner point separated from the equator of the tire at a distance corresponding to 1/10 tread width; wherein said reinforcing ply has a total modulus of elasticity in cord direction per unit width corresponding to 10%-35% of a total modulus of elasticity in cord direction of said belt ply per unit width.

2. The tire of claim 1 wherein said tread comprises at least four annular main circumferential grooves, said main grooves being arranged substantially in parallel with said tire equator and defining a center rib and a pair of side ribs.

3. The tire of claim 2 wherein an inner end in a widthwise direction of each of said first and second reinforcing ply segments being located outward from an innermost end of said main groove between said center rib and a side rib in the widthwise direction.

4. The tire of claim 3 further comprising a plurality of lateral grooves separated from each other in the circumferential direction of the tire and opening to said main grooves formed in said center rib.

5. The tire of claim 4 wherein said lateral grooves comprise sipes.

6. The tire of claim 2 further comprising a centerline main circumferential groove bisecting said center rib into two center rib portions.

7. The tire of claim 6 further comprising lateral grooves in each of said center rib portions, said lateral grooves separated from each other in the circumferential direction of the tire and opening to said centerline main circumferential groove.

8. A low-section pneumatic radial tire comprising: a carcass composed of at least one carcass ply containing cords embedded therein so as to substantially extend in the radial direction of the tire, a tread arranged outside said carcass in the radial direction; a belt composed of at least two belt plies containing cords therein, cords of which plies being crossed with each other at an angle of 10° to 40° with respect to the equator of the tire, said tire having an aspect ratio of not more than 0.85, a reinforcing layer composed of two or less reinforcing plies each containing cords arranged at an inclination angle of 0°–10° with respect to the equator of the tire is arranged between a belt ply arranged at an outermost side in the radial direction and the carcass, at least one ply of said reinforcing layer comprising axially-spaced apart first and second reinforcing ply segments; at least four annular main circumferential grooves arranged in substantially parallel to said equator are formed on an outer circumference of said tire to define a center rib at a central part of said tread in the widthwise direction thereof and a pair of said ribs located at both sides of said center rib, and an inner end in a widthwise direction of each of said first and second reinforcing ply segments being located outward from an innermost end of said main groove between said center rib and said side rib in the widthwise direction, and a plurality of lateral grooves separated from each other in the circumferential direction of the tire and opening to said main grooves in said center rib.

9. The tire of claim 3 wherein each of said first and second reinforcing plies is located between an outer-point separated from a shoulder end at a distance corresponding to 1/7 of tread width and an inner point separated from the tire equator at a distance corresponding to 1/10 of tread width.

10. The tire of claim 8 wherein said reinforcing ply has a total modulus of elasticity in cord direction per unit width corresponding to 10%–35% of a total modulus of elasticity in cord direction of said belt ply per unit width.

11. The tire of claim 8 further comprising a fifth annular main circumferential groove, said fifth main circumferential groove bisecting said center rib into two center rib portions and said lateral grooves in each of said center rib portions and opening to said fifth main circumferential groove.

* * * * *